Dec. 11, 1928.  
J. LOCKHART  
CONVEYER  
Filed June 2, 1927  
1,695,115  
3 Sheets-Sheet 2
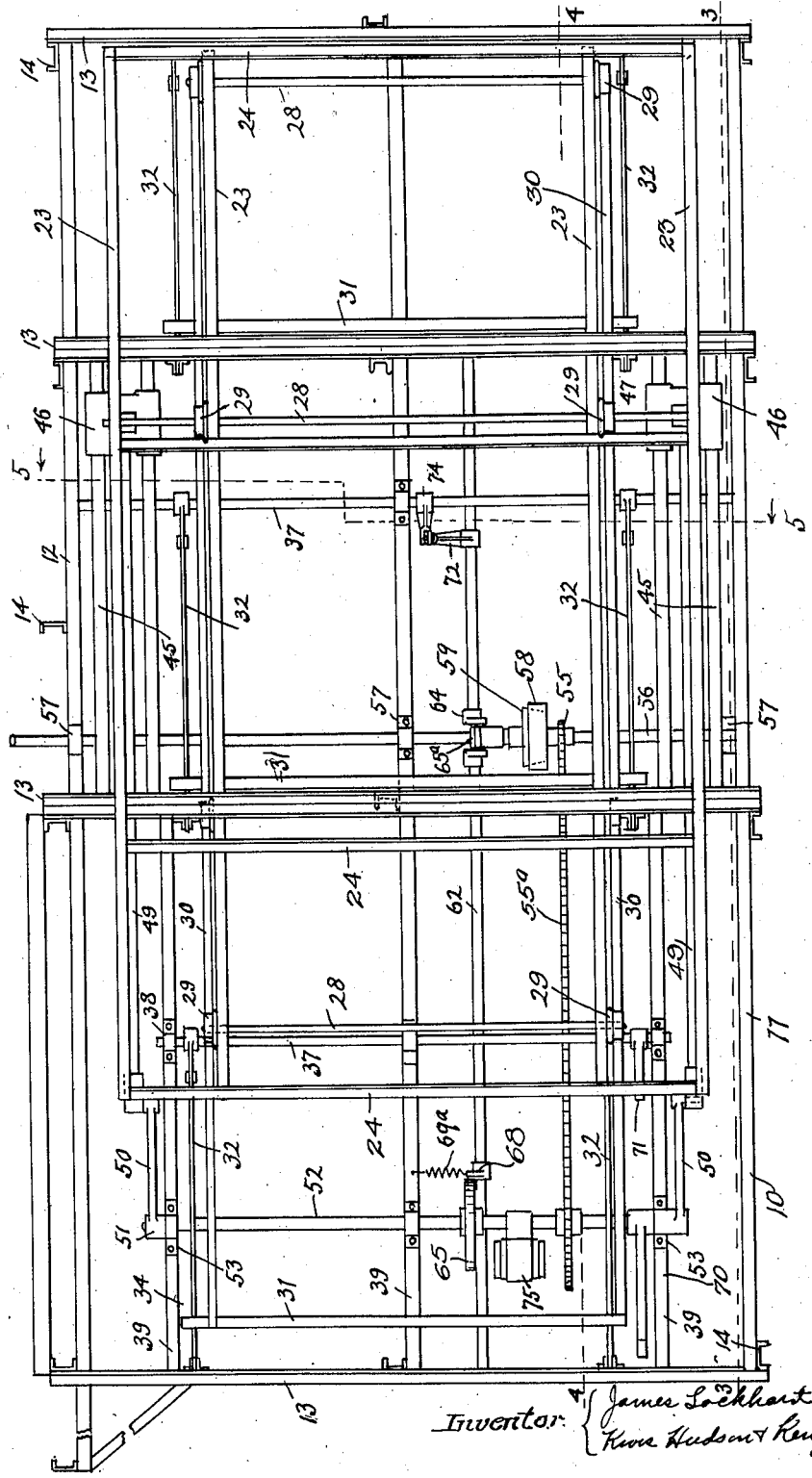

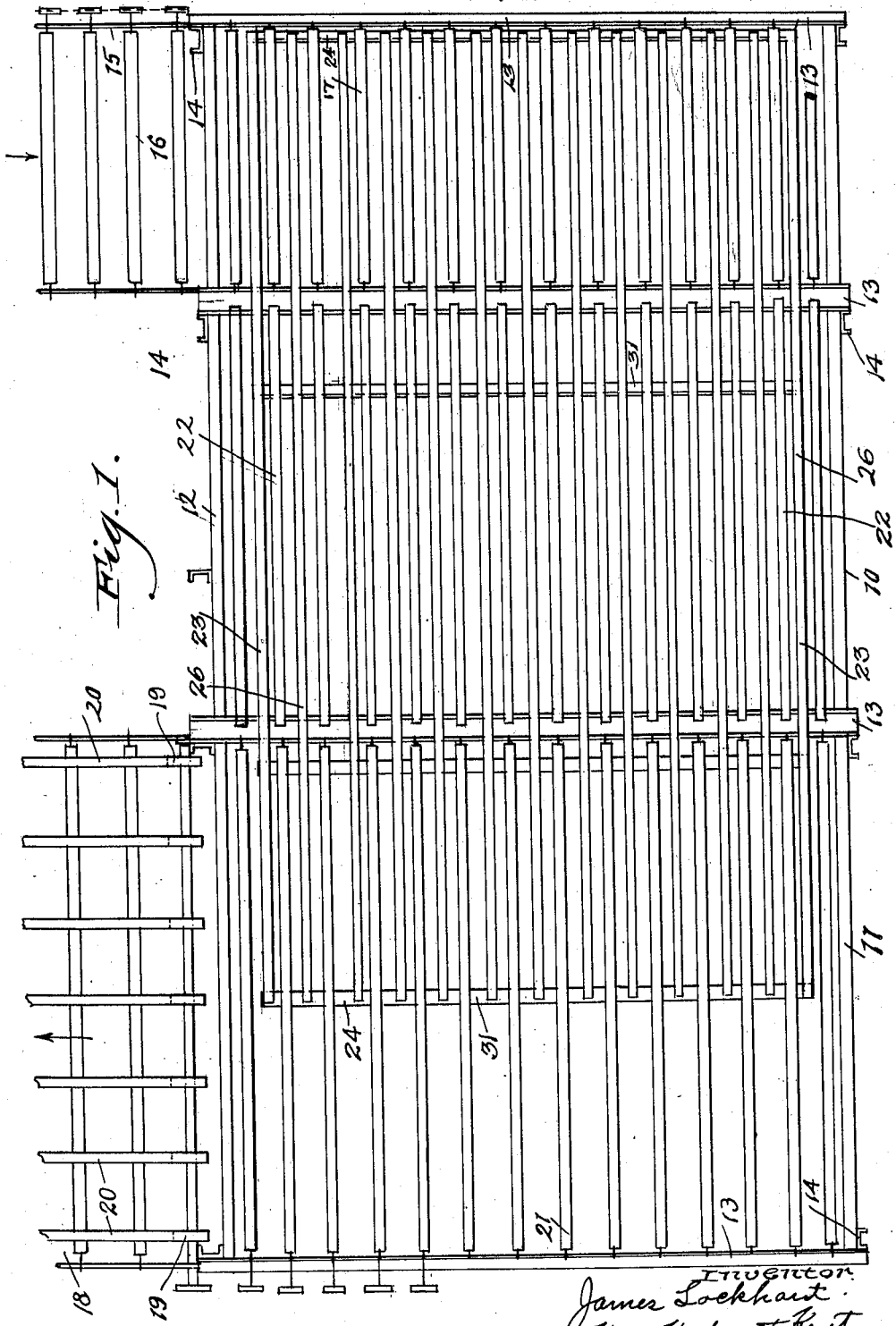

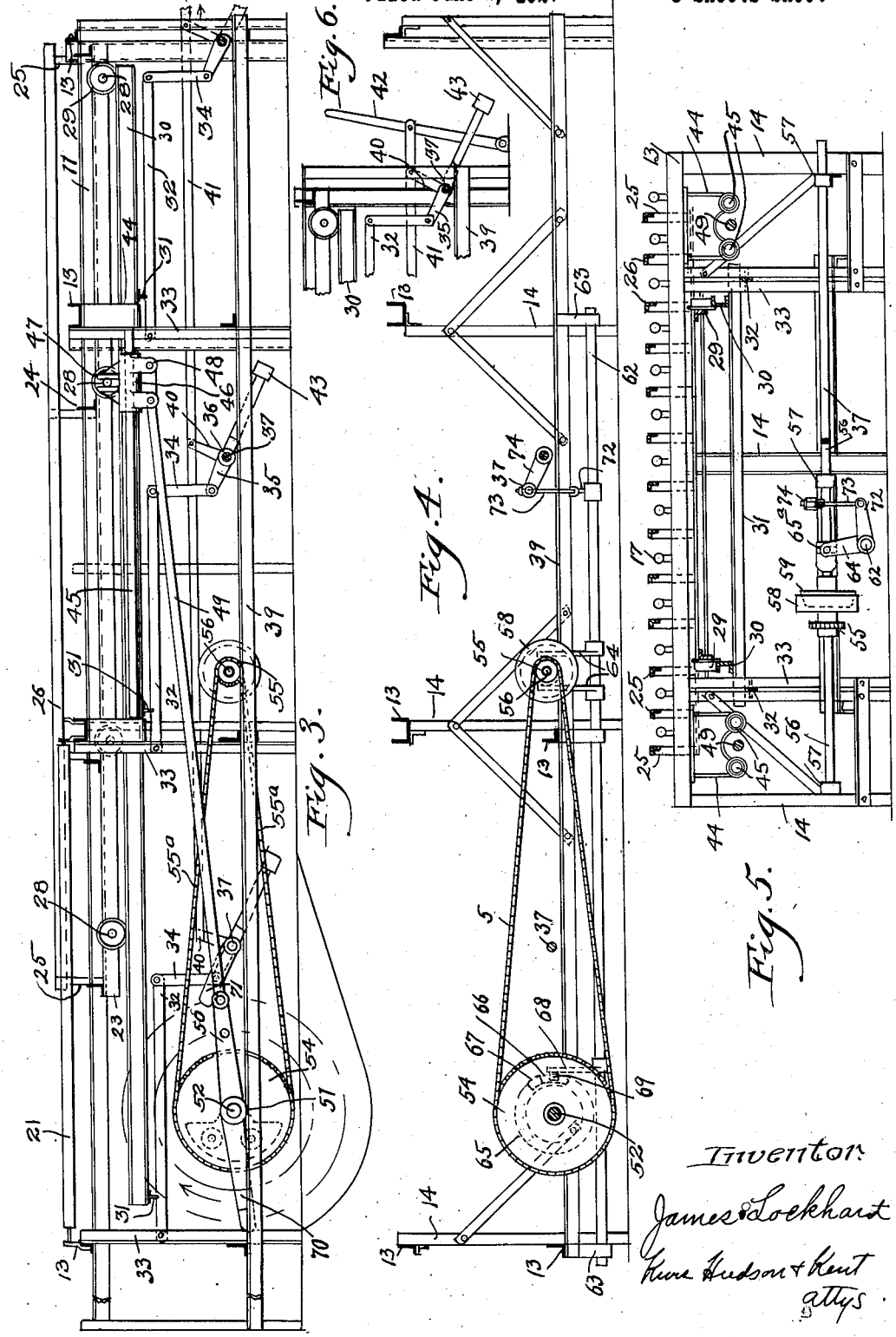

Patented Dec. 11, 1928.

1,695,115

UNITED STATES PATENT OFFICE.

JAMES LOCKHART, OF PAINESVILLE, OHIO, ASSIGNOR TO THE COE MANUFACTURING COMPANY, OF PAINESVILLE, OHIO, A CORPORATION OF OHIO.

CONVEYER.

Application filed June 2, 1927. Serial No. 195,921.

This invention relates to conveyers, and more particularly to a transfer carriage for use in conjunction with a transfer table adapted to transfer sheets of elongated material, such as composition board, from one conveyer which feeds the articles onto the transfer table, to a second conveyer extending parallel with the first conveyer for removing the articles from the transfer table.

The primary object of the invention is to provide a transfer carriage adapted to advance the articles upon the transfer table progressively or step by step, by movement of the transfer carriage.

Another object of the invention is to provide a means for operating the transfer carriage so as to positively control the reciprocation thereof, which means affords an even movement for the transfer carriage, thereby resulting in quiet operation.

A further object of the invention is to provide means for controlling the movement of the transfer carriage, wherein, upon the return of the carriage to its initial position, the power from the main drive shaft for operating the transfer carriage is automatically disengaged, thereby rendering the carriage inoperative until the main drive shaft is again manually connected to the mechanism for operating the transfer carriage.

Another object of the present invention is to provide means for automatically lowering the transfer carriage when the latter has moved to its discharging position, wherefrom the transfer carriage is returned to its lowered initial position, where it is adapted to be again manually raised for lifting a plurality of spaced articles resting upon the transfer table and to further advance thereon the transfer table.

Another object of the invention is to provide adjustable means adapted to control the reciprocating movement of the transfer carriage.

With the objects above indicated and other objects herein explained in view, my invention consists in the construction and combination of elements hereinafter described and claimed.

Referring to the drawings:

Figure 1 is a top plan view of the transfer table, showing the relative position of the transfer carriage thereto and to a pair of horizontally spaced conveyers.

Figure 2 is a top plan view of the transfer table and transfer carriage with the rollers removed from the table and the supporting members removed from the transfer carriage.

Figure 3 is a longitudinal cross-sectional view taken on the line 3—3 of Figure 2, showing the transfer carriage in its raised initial position.

Figure 4 is a longitudinal cross-sectional view taken on the line 4—4 of Figure 2, showing the cammed disc and its associated mechanism for controlling the movement of the transfer carriage.

Figure 5 is a transverse cross-sectional view taken on the line 5—5 of Figure 2 and showing the clutch operating mechanism.

Figure 6 is a detail view illustrating a portion of the carriage raising mechanism.

In the drawings, 10 indicates generally the transfer table which consists of longitudinally extending frame members 11 and 12, respectively, and transverse angle members 13 suitably joined together to form a rigid frame. This frame is suitably supported in a horizontal position by channel upright members 14 suitably connected at their upper ends to the frame and angle members respectively. The particular construction herein disclosed is of no importance, and shows a diagrammatic structure only which will suffice for the purpose of description. The numeral 15 indicates a conveyer positioned at right angles to one end of the transfer table 10, and is provided with a plurality of driven rollers 16 which, upon actuation, causes the sheets of board or other articles to be fed onto a plurality of freely rotatable rollers 17 journaled in the upstanding leg of the transverse angle members 13. At the opposite end of the transfer table 10 is a conveyer 18, consisting of a plurality of driven wheels 19 which engage and are adapted to advance a plurality of endless belts 20 for removing the boards or elongated articles from the discharge end of the transfer table. At the discharge end of the transfer table and between the adjacent transverse angle members 13, are a plurality of rollers 21, a portion of which adjacent the conveyer 18 are adapted to be positively rotated, while the remainder are freely mounted within the upstanding legs of the transverse angle members 13. Between the rollers 17 and the rollers 21 and in alignment therewith are a plurality of flat bars 22 which are supported upon the upper edges of the upstanding legs of the adjacent transverse angle members 13. These bars may be suitably connected to the transverse angle members 13, and the upper surface thereof should be substantially in the same plane with the rollers 17 and 21 so as to afford a substantially flat top table. Briefly stated, the elongated articles or pieces of composition board, are fed by the rollers 16 onto the rollers 17 until they are in proper position thereon, at which time the transfer carriage is raised, thereby raising the board from the rollers 17, and the carriage is then moved longitudinally for its limit of travel where it is then lowered and the elongated article or composition board is lowered into engagement with the bars 22. The carriage is then returned to its lowered initial position and the same cycle of operations takes place until the articles are deposited upon the discharge rollers 21. A portion of these rollers being positively rotated causes the articles to be moved transversely off of the transfer table and onto the endless belts 20 of the conveyer 18, where they are moved to any suitable location. The arrangement, so far described, is substantially the same as that disclosed in my earlier application, Serial No. 133,366, filed September 3, 1926, patented May 29, 1928, No. 1,671,534, and forms no part of the present invention except in combination with the transfer carriage.

The transfer carriage consists of longitudinally extending angle members 23, which are held in parallel spaced relation by a plurality of transverse angle members 24 bolted or otherwise secured thereto. The transverse angles 24 are provided with a plurality of upstanding arms 25 suitably connected thereto and have connected to their upper ends a plurality of longitudinally extending angles 26 positioned in alternate relation to the rollers 16 and 21 and bars 22 of the transfer table 10. These angles 26 are adapted to provide a supporting surface for the sheets of composition board or other flat articles and to advance the latter as heretofore described. In the depending flanges of the longitudinally extending side members 23 are journaled a plurality of transverse shafts or axles 28 and the ends of the latter extending beyond the angle side members 23 have rotatably mounted thereon flanged wheels 29. The wheels 29 of the transfer carriage engage with and ride upon a pair of longitudinally extending tracks 30 which are suitably spaced apart and maintained in fixed spaced relation by a plurality of transversely extending T-bars 31 positioned longitudinally throughout the length of the track 30.

As heretofore explained, it is important to have the carriage raised and lowered depending upon the direction of movement of the transfer carriage, and in the present instance this is obtained by providing a plurality of bars 32 upon which the T-bars 31 are positioned. The bars 32 are pivoted to vertically extending uprights 33 rigidly connected to the transverse angle members 13. The free end of the bars 32 have pivotally connected thereto links 34 which in turn have their opposite ends pivotally connected to arms 35 of bell crank levers 36. These bell crank levers 36 are rigidly mounted upon transverse shafts 37 journaled in bearings 38, the latter being rigidly mounted upon longitudinally extending angle members 39 rigidly connected to the lower portion of the uprights 14. The arms 40 of the bell crank levers 36 are pivotally connected to longitudinally extending bars 41, the latter being reciprocated by means of a pivoted operating lever 42 to which the arm is loosely connected. To assist in the actuation of the lever 42 the bell crank levers 36 are provided with counter-weights 43 which enables the operator to more easily raise the carriage and track into its elevated position.

It will, therefore, be readily seen from the description so far advanced that the transfer carriage is adapted to be reciprocated upon the tracks 30, and that by actuation of the rod 41 in one direction or the other, the transfer carriage will be raised or lowered as desired.

The movement of the carriage in a longitudinal direction is, of course, to be automatic, and this is accomplished in the present instance by extending one of the shafts 28 substantially beyond the wheels 29 as clearly shown in Figure 2. Brackets 44 are positioned upon opposite sides of the transfer carriage and suspended from the transverse angle members 13, as clearly shown in Figure 5. These brackets 44 rigidly support pairs of parallel spaced rods 45 which receive and support slide members 46 adapted to be freely reciprocated thereon. The slides are provided with pairs of upstanding arms 47 upon their upper surfaces which engage the extended ends of the shaft or axle 28, so that upon longitudinal movement of the slides 46 the movement of the transfer carriage will be controlled thereby. The under side of the slides 46 are provided with pairs of ears 48, one positioned at the front of the slides, while the other is positioned at the rear of the slides for a purpose to be later described.

As shown in Figure 3, rods 49 are pivotally connected to the forward pair of ears of the slides 46, while the opposite ends are pivotally connected to arms 50 of levers 51. These levers are mounted on a transverse shaft 52, suitably journaled in bearings 53 supported upon the longitudinally extending angle members 39. The shaft 52 is rotated by means of a sprocket wheel 54, keyed or otherwise secured to the transverse shaft 52 and connected to a sprocket wheel 55 by a sprocket chain 55ª. This sprocket wheel 55 is loosely mounted upon a main drive shaft 56, suitably journaled in bearings 57, mounted upon the longitudinally extending member 39 and the upright 14. The hub of the sprocket wheel 55 is provided with a clutch member 58, with which is adapted to engage a clutch disc 59 slidably mounted upon the main drive shaft 56. It will, therefore, be readily seen that upon engagement between the clutch disc 59 and the clutch member 58, the sprocket wheel 54 will be rotated, thereby causing the arm 50 of the link 51 to be moved in a central path which causes the slides 46 to be reciprocated upon the rods 45, and as the shaft or axle 28 of the carriage is in engagement with extensions on the slides 46, the carriage will be likewise reciprocated upon the tracks 30.

It is advisable to provide means for disengaging the clutch at certain times so that the carriage will be maintained in a state of rest, and in the present instance this is obtained by providing a longitudinally extending shaft 62 suitably journaled in bearings 63 connected to and suspended from the under side of the lower transverse members 13. This shaft 62 has mounted thereon adjacent the clutch disc 59 a pair of upwardly extending arms 64 having portions adapted to engage with a circumferential groove 65ª in the hub of the clutch disc 59. This engagement should be such that the clutch disc 59 can be readily moved laterally out of engagement with the clutch member 58 and yet permit the clutch disc 59 to be freely rotated between the upstanding arms 64. The operation of the clutch is controlled throughout the cycle of operation of the transfer carriage by a cammed disc 65 rigidly connected to the transverse shaft 52 and the disc provided with a recess 66 and a tapered portion 67. The longitudinally extending shaft 62 has provided upon its end and adjacent the cammed disc 65, an upwardly extending arm 68 provided with a roller 69 adapted to engage with one surface of the cammed disc 65 adjacent the outer edge thereof. This roller is in such a position that upon rotation of the cammed disc 65 the former will be moved within the opening 66 by means of a spring 69 connected to the upstanding arm 68 and to the longitudinally extending angle member 39. This recess 66 within the cammed disc 65 is so positioned that at the time the transfer carriage is at its lowered initial position, the roller 69 is disposed within this recess and the clutch disc 59 is out of engagement with the clutch member 58 so that no power is transmitted through the sprocket chain 55ª to the transverse shaft 52 and the transfer carriage is at rest. However, when the roller 69 is in engagement with the face of the cammed disc 65 the clutch is in engaged position during a complete revolution of the cammed disc, during which time the transfer carriage has been moved through its cycle of operation.

While the transfer carriage is raised manually by moving the lever 42 in a rearward direction it is advantageous, however, to provide means for automatically lowering the transfer carriage after it has reached its discharge position. To effect such an automatic lowering the lever 51 on the transverse shaft 52 is provided with an arm 70 formed integral therewith and extending oppositely but parallel with the arm 50. The transverse shaft 37 at the discharge end of the transfer table has secured thereto a trip member 71 which extends outwardly into the path of movement of the arm 70 as the latter is rotated around the shaft 52. When the transfer carriage has been moved to its discharging position this arm 70 is moved into engagement with the trip member 71, and as the shaft 52 is being positively rotated by the main drive shaft 60 it forces the trip member 71 downwardly which results in oscillating each of the transverse shafts 37, and as the tracks 30 are supported upon a link mechanism connected to the shafts 37, the track is automatically lowered into a position in which the transfer carriage can be returned to its lowered initial position.

When the transfer carriage has been returned to its lowered initial position it can only be elevated by actuating the lever 42 which causes the track 30 to be elevated to its raised initial position through the link mechanism 32, 34 and 35. As the roller 69 is disposed within the opening 66 of the cammed disc 65 when the transfer carriage is in this elevated position, the clutch is in disengaged position, and to engage the clutch in opposition to the spring 69, an arm 72 is secured to the longitudinally extending shaft 62 and has extending from its free end a vertically adjustable rod 73 which slidably engages the outer end of an arm 74 connected to one of the transverse shafts 37.

It will, therefore, be seen that while the lever 42 is moved so as to elevate the transfer carriage, the link 74 is also oscillated about the axis of the transverse shaft 37 which, through the rod connection 73 oscillates the longitudinally extending shaft 62, thereby moving the clutch disc 59 on the main drive shaft 56 into engagement with the disc member 58, and at the same time moving the arm 68 carrying the roller 69 out of engagement with the recess 66 in the cammed disc 65. When the cammed disc 65 has been rotated sufficiently through engagement of the clutch members to move the recess 66 out of engagement with the roller 69, the latter engages the face of the cammed disc 65 throughout the remainder of its rotation and automatically maintains the clutch in engaging position without the necessity of the operator continually holding the lever 42 in outward position. During the rotation of this disc 65 the transfer carriage has been moved forwardly to its discharging position, at which time the arm 70 actuates the trip member 71 which automatically lowers the track 33 supporting the carriage, and as the shaft 52 is further rotated the carriage is returned to its lowered initial position. At just about the time the carriage returns to its initial position the recess 66 in the cammed disc 65 has returned to a position adjacent the roller 69 of the arms 68 and the tension of the spring 69$^a$ draws the arm 68 inwardly thereby oscillating the longitudinal shaft 62, which moves the clutch disc 59 out of engagement with the clutch member 58 and cuts off the power from the main drive shaft 60 to the carriage actuating shaft 52.

We will assume that the transfer table has positioned thereon a section of composition board which has been fed onto the table by the conveyer 16 and it is desired to transfer this piece of composition board to a position wherein it can be removed from the transfer table by the conveyer 18. With the transfer carriage in its initial lowered position the operator moves the lever 42 to the position shown in Figure 6, which causes the track 30 to be raised, thereby elevating the transfer carriage to the position shown in Figure 3, which movement has removed the piece of composition board from the rollers 17 of the transfer table. Simultaneously with the operation of the lever 42, the clutch members 58 and 59 have been moved into engagement, and through the sprocket chain 56 the shaft 52 is rotated, which causes the arms 50 of the link 51 to be moved in a circular path of movement. As these arms 50 are connected to the slides 46, which in turn are connected to the transfer carriage, the latter is moved longitudinally to its limit of travel or until the arm 50 has been moved through an arc of approximately 180° from the position shown in Figure 3. At this time the arm 70 also carried by the shaft 52 has been rotated into engagement with the trip member 71, and as the shaft 52 is being positively rotated by the main drive shaft, the trip member 71 is depressed and being connected to one of the transverse shafts 37 the latter is oscillated thereby and through the link mechanism the track 30 is moved into its lowered position, whereby the sheet of composition board is suitably deposited upon the transfer table. As the shaft 52 is further rotated the carriage is returned to its lowered initial position, at which time the recess 66 in the cammed disc 65 has been moved to a position adjacent the roller 69 of the arm 68 and the spring 69$^a$ draws the arm 68 inwardly, which movement oscillates the longitudinally extending shaft 62 to disengage the clutch members 58 and 59 and thereby cut off the power from the main drive shaft.

This cycle of operations is repeated until the composition board or other elongated articles have been advanced step by step upon the conveyer table to a position in which they are engaged by the driven rollers 21, which results in removing the composition board or other elongated articles from the transfer table onto the conveyer 18 where the former are delivered to any desirable point.

It will be readily seen from the description heretofore that the operation of the transfer carriage is entirely within the control of the operator, inasmuch as the carriage is brought to a stand-still after having completed one cycle of operation, which carriage can not be again reciprocated through a cycle of operation until the lever 42 has been actuated to move the transfer carriage into elevated position. It is, therefore, possible with the present arrangement for the operator to see that the rollers 21 of the transfer carriage are cleared before he actuates the lever 42 to further advance the composition board or other elongated articles upon the conveyor. To assist in the rotation of the shaft 52 a counterweight 75 is suitably secured to the shaft at a position indicated in Figure 2.

While I have described the preferred construction and operation of the transfer carriage, it is to be understood that I am not to be limited to the precise structure, but may make certain changes as will be apparent without departing from the spirit of the invention as defined in the appended claims.

Having thus described my invention what I claim is:

1. In a transfer table, an article supporting frame, a transfer carriage adapted to successively advance articles upon said supporting frame, means for actuating said carriage, a main drive shaft, means for connecting said drive shaft to said carriage actuating means to move the carriage forward and backward, and means for automatically disconnecting the carriage actuating means from said drive shaft when said carriage has returned to its initial position.

2. In a transfer table, an article support ing frame, a transfer carriage adapted to successively advance articles upon said supporting frame, means for actuating said carriage, a main drive shaft, a clutch for connecting said drive shaft to said carriage actuating means, means for engaging said clutch, means for maintaining said clutch in engaged position during the cycle of operations of said carriage, and means for automatically disengaging said clutch upon completion of the cycle of operations.

3. In a transfer table of the type described, an article supporting frame, a transfer carriage adapted to successively advance articles along said frame, means for actuating said carriage, a carriage supporting frame, means for actuating said carriage supporting frame, a main drive shaft, a clutch for connecting said drive shaft to said carriage actuating means and adapted to be moved in engaged position by said carriage supporting frame actuating means, means for maintaining said clutch in engaged position throughout the cycle of operations of said carriage, and means for automatically disengaging said clutch when said carriage completes its cycle of operations.

4. In a transfer table of the type described, an article supporting frame, a reciprocating transfer carriage within said frame adapted to advance articles along said supporting frame, carriage supporting means along which said carriage is reciprocated, means for raising said carriage supporting means, means for moving said carriage in a forward and rearward direction, a main drive shaft, a clutch for connecting said drive shaft to said carriage moving means and moved into engaged position by said raising means, means for maintaining said clutch in engaged position while said carriage is moved forward and rearward, means for automatically lowering said carriage at its foremost position, and means for automatically disengaging said clutch when said carriage has returned to its initial rearward position.

5. In a transfer table of the type described, an article supporting frame, a transfer carriage beneath said supporting frame adapted to successively advance the articles along the latter, means for supporting said carriage and along which the latter is adapted to move forward and rearward, means for raising said carriage supporting means, a main drive shaft, means for moving said carriage forward and rearward including sprocket wheels and sprocket chain, one of said sprocket wheels being loosely mounted on said drive shaft, means for actuating said carriage moving means upon the raising of said carriage supporting means, means for maintaining said carriage moving means in operation during the forward and rearward movement of said carriage, means for lowering said carriage at its foremost position, and means for automatically disconnecting said carriage actuating means when said carriage has returned to its rearmost position.

6. In a transfer table of the type described, an article supporting frame, a transfer carriage adapted to successively advance articles along said frame, a track for supporting said carriage and upon which the latter is adapted to move forward and rearward, slides mounted upon said frame and engaging said carriage for moving the latter, means for raising and lowering said track, and means for reciprocating said slides.

7. In a transfer table of the type described, an article supporting frame, a transfer carriage adapted to successively advance articles along said frame, a track for supporting said carriage and upon which the latter is adapted to move forward and rearward, slides supported upon opposite sides of said frame and loosely connected to said carriage for moving the latter, means for raising and lowering said track, and means for reciprocating said slides.

8. In a transfer table of the type described, an article supporting frame, a transfer carriage adapted to successively advance articles along said frame, a track for supporting said carriage and upon which the latter is adapted to move forward and rearward, slides mounted on said frames and connected to portions of said carriage to permit relative vertical movement therebetween, means for raising and lowering said track, and means for reciprocating said slides.

9. In a transfer table of the type described, an article supporting frame, a transfer carriage adapted to successively advance articles along said frame, a track for supporting said carriage and upon which the latter is adapted to move forward and rearward, slides mounted on said frame and engaging portions of said carriage, means for varying the travel of said slides, means for raising and lowering said track, and means for reciprocating said slides.

10. In a transfer table of the type described, an article supporting frame, a transfer carriage adapted to successively advance articles along said frame, a track for supporting said carriage and upon which the latter is adapted to move forward and rearward, slides supported on said frame and provided with portions engaging said carriage, means for reciprocating said slides, means for raising said track and simultaneously actuating said slide reciprocating means, means for maintaining said slide reciprocating means in operation, means for lowering said track and means for disconnecting said slide reciprocating means when said carriage has returned to its initial position.

11. In a transfer table of the type described an article supporting frame, a transfer carriage adapted to successively advance articles along said frame, a track for supporting said carriage and upon which the latter is adapted to move forward and rearward, slides supported on said frame and provided with portions engaging said carriage, means for reciprocating said slides, means for raising said track and simultaneously actuating said slide reciprocating means, means for maintaining said slide reciprocating means in operation independently of said track raising means, means for lowering said track, and means for disconnecting said slide reciprocating means when said carriage has returned to its initial position.

12. In a transfer table of the type described, a supporting frame having article supporting members, a track frame beneath said members, a transfer carriage mounted on said track frame and having article supporting members, means for raising said track frame to thereby raise the article supporting members of said carriage above the article supporting members of said supporting frame, a main drive shaft, means associated with said drive shaft for moving said carriage forward and rearward on said track frame, said means being operable upon actuation of said track raising means, means for lowering said track frame, and means for disengaging the carriage moving means when said carriage has returned to its initial position.

13. In transfer table of the type described, a supporting frame having article supporting members, a transfer carriage mounted beneath said supporting members and provided with article supporting members, means for raising said carriage to thereby raise said article supporting members above the article supporting members of said supporting frame, a main drive shaft, means associated with said drive shaft for moving said carriage in one direction when the latter is raised, means for lowering said carriage, actuating means for said carriage, and means for disengaging the carriage moving means from the drive shaft when said carriage has returned to its initial position.

14. In a transfer table of the type described, a supporting frame having article supporting members, a transfer carriage mounted beneath said supporting members and provided with article supporting members, means for raising said carriage to thereby raise said article supporting members above the article supporting members of said supporting frame, a main drive shaft, actuating means for said carriage associated with said main drive shaft and operable by said carriage raising means, means for lowering said carriage, and means for automatically rendering said actuating means inoperative when said carriage has returned to its initial position.

In testimony whereof, I hereunto affix my signature.

JAMES LOCKHART.